US009172272B2

(12) United States Patent  
Malo

(10) Patent No.: US 9,172,272 B2  
(45) Date of Patent: Oct. 27, 2015

(54) ELECTRICAL POWER DISTRIBUTION SYSTEM

(75) Inventor: James R. Malo, Barkhamsted, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 897 days.

(21) Appl. No.: 13/399,387

(22) Filed: Feb. 17, 2012

(65) Prior Publication Data

US 2013/0214597 A1     Aug. 22, 2013

(51) Int. Cl.
*H02J 1/00* (2006.01)
*H02J 9/06* (2006.01)

(52) U.S. Cl.
CPC ............... *H02J 9/06* (2013.01); *Y10T 307/344* (2015.04); *Y10T 307/615* (2015.04)

(58) Field of Classification Search
CPC .......................................................... H02J 9/06
USPC ........................................................... 307/80
See application file for complete search history.

(56) References Cited

U.S. PATENT DOCUMENTS

| 5,764,502 | A | 6/1998 | Morgan et al. |
| 5,844,329 | A | 12/1998 | Bailey et al. |
| 7,482,709 | B2 | 1/2009 | Berenger |
| 7,538,521 | B2 * | 5/2009 | Berenger ........................ 322/25 |
| 7,626,798 | B2 * | 12/2009 | Rusan et al. ................. 361/93.6 |
| 7,656,637 | B2 | 2/2010 | McAvoy et al. |
| 2006/0168968 | A1 * | 8/2006 | Zielinski et al. ................ 60/778 |
| 2009/0256419 | A1 * | 10/2009 | Anghel et al. ................. 307/9.1 |
| 2011/0067393 | A1 * | 3/2011 | Chase ............................. 60/484 |
| 2011/0101773 | A1 | 5/2011 | Incerpi |

* cited by examiner

*Primary Examiner* — Jared Fureman  
*Assistant Examiner* — Duc M Pham  
(74) *Attorney, Agent, or Firm* — Cantor Colburn LLP

(57) ABSTRACT

A distributed electrical power system includes a first AC generator configured for supplying an AC voltage; a second AC generator configured for supplying the AC electrical voltage; an AC power distribution network connected to the first AC generator and the second AC generator for receiving the AC voltage, the AC power distribution network including a two or four-wire AC power distribution circuit; at least one (solid state circuit breaker (SSCB) module remotely located for receiving the AC voltage from the power distribution network; a system controller connected to a data bus for controlling operation of the at least one power distribution module; and at least one contactor for selectively switching supply of the AC voltage to the at least one power distribution module from either the first AC generator or the second AC generator upon failure of either of the first AC generator or the second AC generator.

20 Claims, 6 Drawing Sheets

ELECTRICAL POWER DISTRIBUTION SYSTEM

FIELD OF INVENTION

The subject matter disclosed herein relates generally to the field of an electrical power distribution system and, particularly, to an electrical power distribution system for an aircraft utilizing a two-wire distributed AC network for delivering AC power to AC circuit breakers at locations throughout the aircraft.

DESCRIPTION OF RELATED ART

In a typical aircraft distribution system, AC electrical power is fed from engine mounted generators to AC Power Distribution Units (PDU). The AC PDU's utilize relays to control power to AC load busses and associated circuit breakers on various circuit breaker panels, generally in the cockpit. This AC electrical power is provided to load equipment through individual wires that feed load equipment utilizing AC power. Additionally, for providing DC power to equipment, this AC electrical power is converted to Direct Current (DC) power and distributed through one or more DC PDU's, which are typically co-located with the AC PDU's. The DC PDU's feed the DC load busses in order to provide DC power to equipment connected thereof, again using circuit breakers. Additionally, load control signals from the AC and DC load busses are hardwired to system controllers in the cockpit in order to control the individual loads connected to the load busses. As a result, this aircraft distribution system requires a heavy, overly complex electrical distribution system, which has frequent timing problems associated with transferring AC and DC load busses to various power sources or removing them from power using complex relay circuitry within the PDU's.

BRIEF SUMMARY

According to one aspect of the invention, a distributed electrical power system includes a first AC generator configured for supplying an AC electrical voltage; a second AC generator configured for supplying the AC electrical voltage; an AC power distribution network connected to the first AC generator and the second AC generator for receiving the AC electrical voltage, the AC power distribution network including a two or four-wire AC power distribution circuit; at least one power distribution module remotely located for receiving the AC electrical voltage from the power distribution network; a system controller connected to a data bus for controlling operation of the at least one power distribution module; and at least one contactor for selectively switching supply of the AC electrical voltage to the at least one power distribution module from either the first AC generator or the second AC generator upon failure of either of the first AC generator or the second AC generator.

According to another aspect of the invention, a method of distributing power in a distributed electrical power system includes providing a plurality of loads connected to an AC power distribution network; supplying AC electrical voltage, via an external AC generator, to the plurality of loads connected to the AC power distribution network; supplying the AC electrical voltage, via an APU generator, to the AC power distribution network; automatically connecting a first percentage of the plurality of loads to the APU generator and a second percentage of the plurality of loads to the external AC generator; the automatically connecting in response to the supplying of the AC electrical voltage from the APU generator; disconnecting the external generator from the AC power distribution network; and automatically connecting the plurality of loads to the APU generator, the automatically connecting in response to the disconnecting of the external generator from the AC power distribution network.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of an electrical power distribution system include a plurality of AC power generators with each directly controlling individual power contactors connected thereof and for providing AC power through a four-wire AC circuit within the system. The system includes AC and DC solid state circuit breakers (SSCB) located remotely in a plurality of power distribution modules remotely located throughout the aircraft for providing AC and DC power where equipment utilizing such power is located. The AC power is routed through the AC circuit to the AC SSCB's and to load equipment connected thereof. Additionally, an AC-to-DC converter is coupled to the AC SSCB at these remote locations to convert the AC power to DC power and supply DC load equipment connected through a plurality of DC SSCB's. The electrical power distribution system includes contactors or relays for switching power between the plurality of AC generators in the event that one or more of the main AC generators were to fail. In embodiments, the system is utilized with hybrid contactors or conventional electromechanical relays with the addition of circuit breakers or other forms of fault protection.

Figure 1:
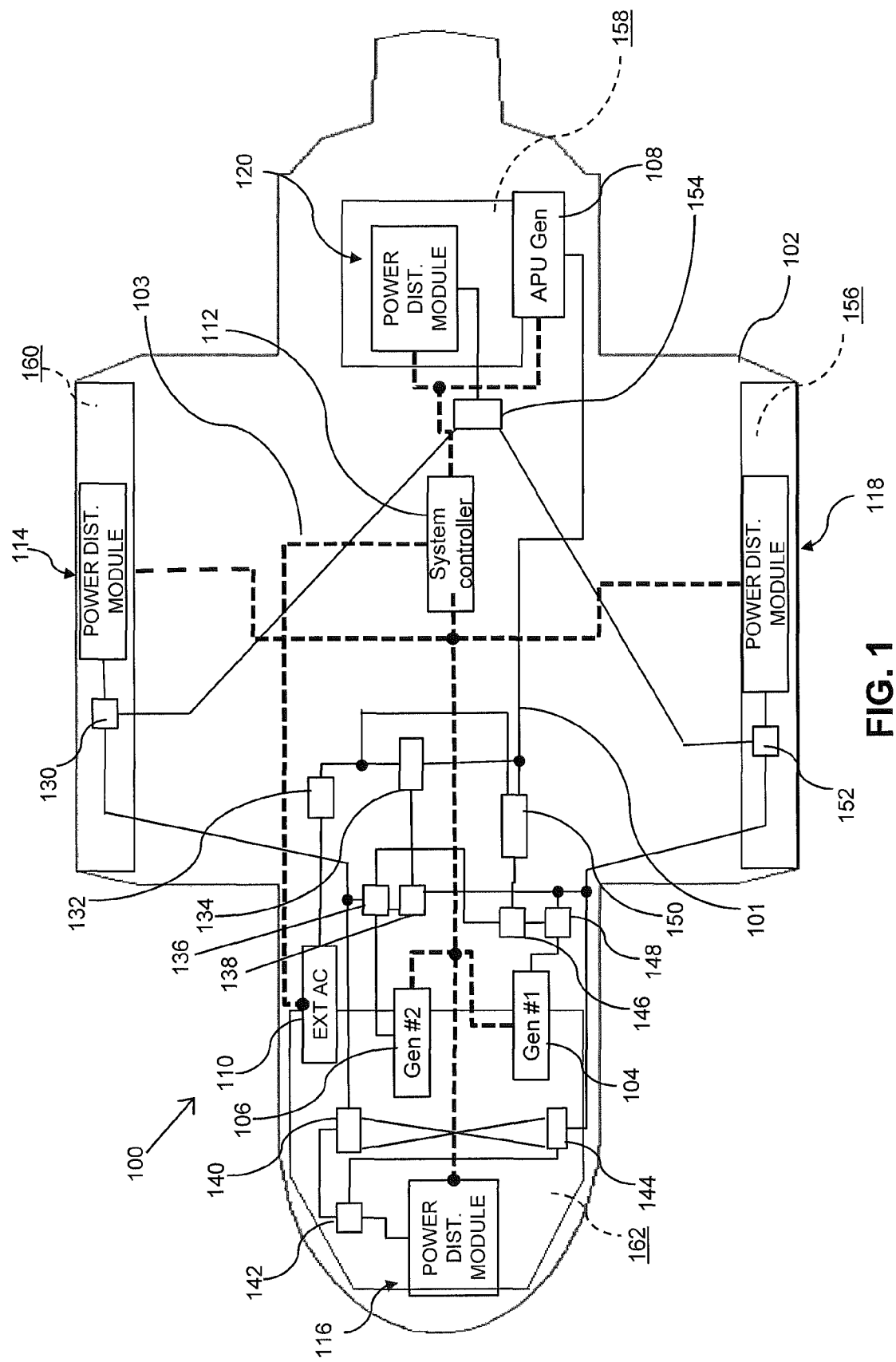
FIG. 1 illustrates a schematic diagram of an aircraft electrical power distribution system according to an embodiment of the invention.
Figure 3A:
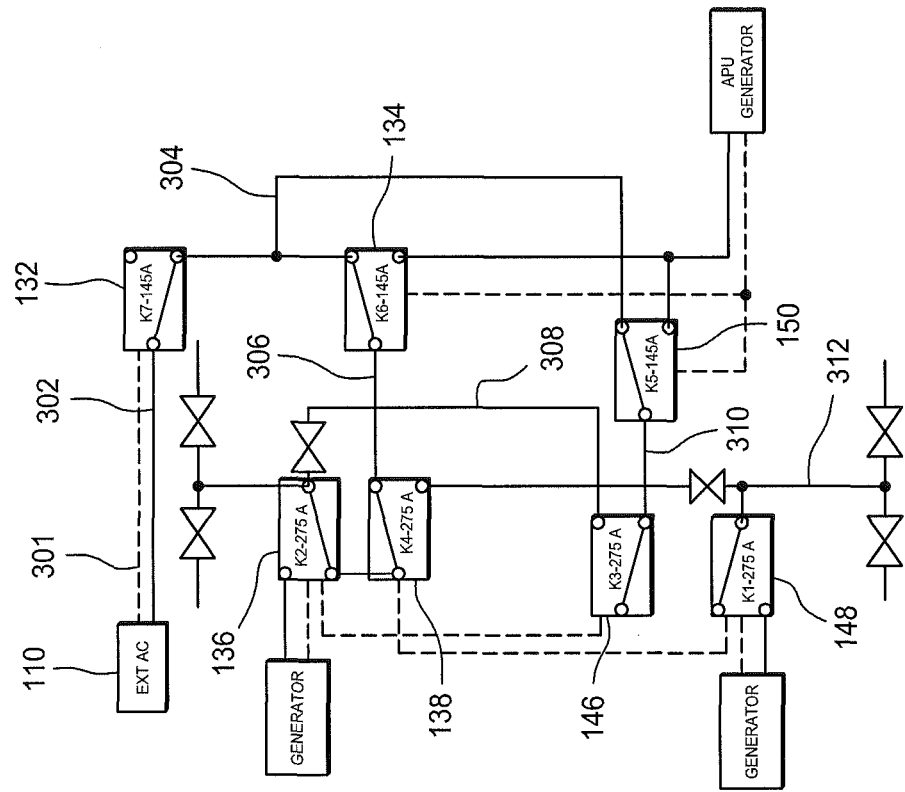
FIG. 3A illustrates a schematic block diagram of an algorithm used to distribute power in an aircraft according to an embodiment of the invention.

Referring now to the drawings, FIG. 1 illustrates an exemplary electrical power distribution system 100 in a vertical takeoff and landing ("VTOL") high-speed rotary-wing aircraft 102 such as, for example, a helicopter according to an embodiment of the invention. Particularly, the electrical power distribution system 100 includes a plurality of main Alternating Current (AC) generators 104, 106, an Auxiliary Power Unit (APU) generator 108, and an external AC generator 110 in electrical communication via a four-wire main AC electrical circuit 101 (shown as a solid line), however, a two-wire main AC electrical circuit may also be utilized in the system 100 without departing from the scope of the invention. The main AC electrical circuit 101 is shown as two-wire for simplifying the discussion of the system 100. In embodiments, the main AC generators 104, 106 are three-phase AC supplies having a ground-neutral for providing three-phase power to the main AC circuit 101. Further, the main AC generators 104, 106, APU generator 108, and external AC generator 110 are connected to a plurality of contactors 130-154 which are geographically located around the aircraft 102 in order to directly provide distributed AC power to these geographical locations through main AC generators 104, 106, as well as standby power through APU generator 108 and external AC generator 110. In a non-limiting example, each of the contactors 130-154 may be a conventional electromechanical relay that makes or breaks a connection with the main AC circuit 101 upon passing an electric current to the relay. In another non-limiting embodiment, the contactors 130-154 may be hybrid contactors. Additionally, the contactors 130-154 include current limiting devices such as, for example, a fuse or a thermal "trip" or other similar types of current sensing and control devices for providing fault protection to the main circuits 101, which are rated to trip when current values traversing through the contactors 130-154 exceed a predetermined current value for a predetermined time. In an embodiment, the contactors 130-154 are rated to open for currents above 145 Amperes. However, other "trip" values may be selected without departing from the scope of the invention. Relays 130, 140, 142, 144, 152 are utilized to route AC power around faulted wiring to maintain power to the SSCBs.

In an embodiment, the main generators 104, 106 distribute AC power through the main AC circuits 101, 163 and 164 via contactors 130-154 to avionics equipment (e.g., loads) located in areas 156, 158, 160, and 162 in aircraft 102. In an embodiment, the main AC generators 104, 106 energize the respective contactors 130-154 for supplying AC power directly through the AC circuit 101, thereby eliminating complex load bussing and timing that is common to prior art power distribution systems. Also, in embodiments, the main AC generator 104 is normally provided to carry the load for one half of the aircraft while main AC generator 106 is provided to carry the load for the other half thereby simplifying the electrical wiring in aircraft 102. During normal operation, contactors attached to main generator 104 and the APU generator 108 transfer one-half of the total aircraft electrical load while contactors attached to main generator 106 and the APU generator 108 transfer the other half of the total aircraft electrical load, thereby eliminating the incidence of contact welding on the contactors switching power to the loads connected to areas 156, 158, 160, and 162. Additionally, in the event of a generator failure, the failed generator's loads are automatically transferred to the remaining functioning generator. It is to be appreciated that generators 104, 106, 108, 110 control their respective output contactors directly with no additional interface needed from the other elements in the electrical power distribution system 100. It is also to be appreciated that generators 104, 106, 108, 110 are configured to turn on as soon as they meet their individual criteria for proper functioning. As such, generators 104, 106, 108, 110 and the contactors 130-154 are synchronized to energize the AC main circuits 101, 163 and 164 without interaction from the other generators in power distribution system 100.

Also shown in FIG. 1, the electrical power distribution system 100 includes s power distribution modules 114, 116, 118, 120 in electrical communication with generators 104, 106, 108, 110 and in communication with a system controller 112 via a communication bus 103 for overall system monitoring and control of individual loads through the power distribution modules 114-120. Particularly, generators 104-110 distribute AC power through the main AC circuits 101, 163 and 164 via contactors 130-154 to avionics equipment (e.g., loads) connected to the power distribution modules 114-120 in aircraft 102. Also, power distribution system 100 includes a system controller 112 connected to a plurality of power distribution modules 114-120 connected to via a communication bus 103 (shown as a dotted line), and control the AC and DC power distributed to loads connected to power distribution modules 114-120 that require AC or DC power. In one non-limiting example, each of the power distribution modules 114-120 includes an AC SSCB 202, an AC to DC converter 204 and a DC SSCB 206 for distributing the AC and DC power, as is shown and described below with reference to FIG. 2. Further, the system controller 112 controls communications to the generators 104-110 and power distribution modules 114-120 via the communication bus circuit 103. In an embodiment, the system controller 112 transmits commands to the SSCBs 114-120 for controlling the operation of the SSCBs 114-120. Further, the system controller 112 communicates, via the communication bus 103, with generators 104-110 in order to provide status for the flight crew and to shut down or start any of the generators 104-110. In one embodiment, the system controller communicates through a serial interface bus such as a UART or CAN (Controller Area Network). In another embodiment, the system controller 112 may communicate directly with the generators 104, 106, 108, 110 or power distribution modules 114-126 via discrete signal lines. It is to be appreciated that the generators 104, 106, 108, 110, once powered on, may energize their respective contactors at random without any interaction, control, or sequencing being received from any other generator. As such, this generator arrangement in connection with the contactors prevents the cross-connection of unsynchronized generators.

In operation, the main generators 104, 106, APU generator 108, and external AC generator 110 energize the main AC circuit 101. Also, the system controller 112 communicates via the communication bus 103 for controlling the power distribution modules 114-120 for distributing AC and DC power to one or more loads connected thereof. The electrical power distribution system 100 provides a simplified AC distribution architecture with contactors 130-154 connected to the main AC circuit 101 for distributing AC power to different geographical locations in the aircraft 102. In embodiments, main AC generators 104, 106 automatically connect to the main AC circuit 101 when the output voltage from each generator 104, 106 has risen to a preset level, with the simplified contactor circuitry automatically preventing any two unsynchronized generators from connecting to each other. The main generators 104, 106 provide AC power to the power distribution modules 114-120, which distributes the AC power to one or more AC load devices connected. Also, each power distribution modules 114-120 converts the AC power through an AC-DC converter for conversion to 28 VDC power. This DC power is distributed to one or more DC load devices that are connected to power distribution modules 114-120. It is to be appreciated that the electrical power distribution system 100 provides a simplified AC distribution architecture by energizing the main AC circuits 101, 163 and 164 and routes AC electrical power from two sets of AC power lines through contactors 130-154, thereby eliminating complex interlock circuits and the transfer times associated with switching multiple busses during normal operation as well as during an interruption in power such as, for example, caused by a short circuit on one or more loads.

Figure 2:
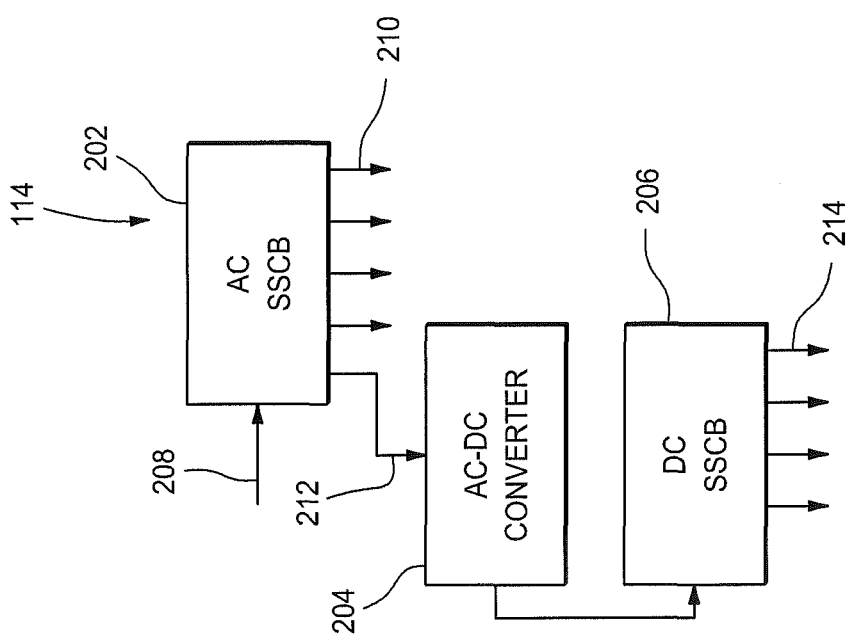
FIG. 2 illustrates a schematic block diagram of a power distribution module shown in FIG. 1 according to an embodiment of the invention.

FIG. 2 illustrates a functional block diagram of a power distribution module such as, for example, power distribution module 114 for supplying AC and DC power to loads according to an embodiment of the invention. Particularly, the power distribution module 114 includes an AC-to-DC converter 204 in serial communication with an AC solid state circuit breaker 202 (SSCB) and a DC solid state circuit breaker 206 (SSCB). For the sake of simplicity and ease of understanding, 3-phase circuits are shown as a single solid line along with single-phase circuits. In embodiments, the AC SSCB 202 is connected to the main circuit 101 or 163 or 164 via AC power line 208 and receives AC power from, in an example, main generator 106. The SSCB 202 distributes the AC power on line 208 to one or more load devices connected on lines 210. Also, the AC SSCB 202 distributes the AC power to an AC-DC converter 204 via line 212 for conversion to 28 VDC power. This DC power is distributed to one or more DC load devices on lines 214 that are connected to the DC SSCB 206. The AC 202 and DC SSCB 206 (FIG. 2) each include a microprocessor programmed with instructions and stored in nonvolatile memory for executing algorithms related to distributing AC and DC power to loads connected to the power distribution modules 114-120. In an embodiment, the AC and DC solid state circuit breakers 202, 206 include a microprocessor programmed with instructions and stored in nonvolatile memory for executing algorithms related to distributing AC and DC power to loads connected to the power distribution module 114. Specifically, the power distribution module 114 communicates with the system controller 112 (FIG. 1) for receiving instructions related to controlling the AC and DC load devices connected to lines 210, 214 respectively. Also, the SSCB's 202, 206 include current limiting circuitry having current limiting devices (not shown) such as, for example, a fuse or a thermal "trip" or electronic trip devices for providing fault protection to load devices connected therewith. The current limiting circuitry (not shown) is rated to trip when current values traversing through the SSCB's 202, 206 exceed a predetermined current value for a predetermined time. It is to be appreciated that power distribution module 114 is substantially the same as power distribution modules 116, 118, 120, and a description of power distribution module 114 provides an adequate description of power distribution modules 116, 118, 120.

Figures 3B, 3C:
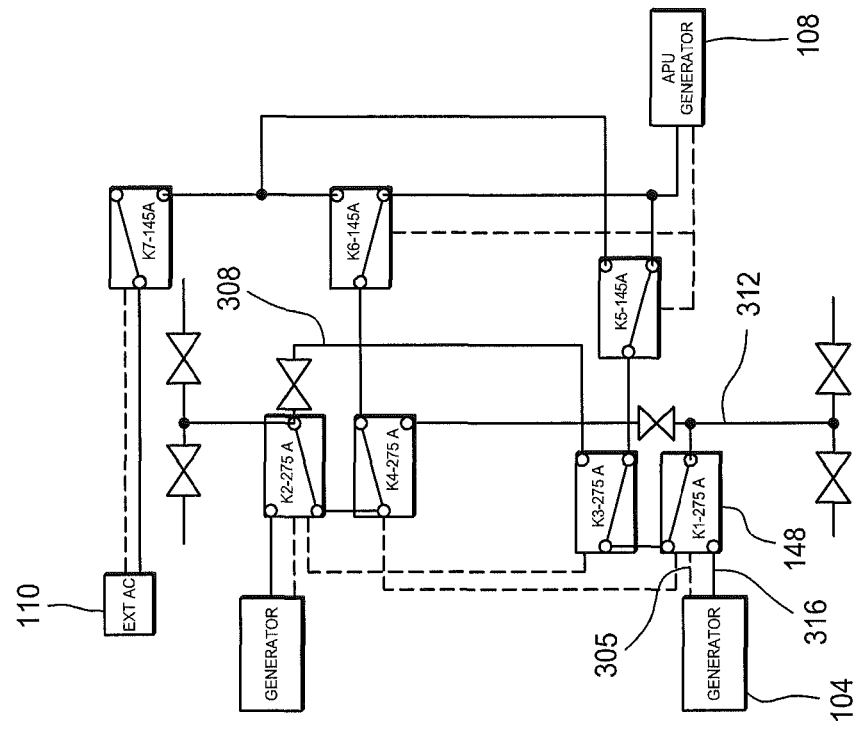
FIG. 3B illustrates another schematic block diagram of an algorithm used to distribute power in an aircraft according to an embodiment of the invention.
FIG. 3C illustrates another schematic block diagram of an algorithm used to distribute power in an aircraft according to an embodiment of the invention.

FIGS. 3A-3G illustrate an algorithm utilized by the system controller 112 (FIG. 1) for providing AC and DC power supplied to the power distribution modules 114-120 from one or more generators 104-110 (FIG. 1) according to an embodiment of the invention. It is to be appreciated that coils (not shown) within contactors 132, 134, 136, 138, 148, 150 (FIG. 1) are energized directly by a line from the generators 104-110 (indicated by dashed lines) causing the contactors 132, 134, 136, 138, 148, 150 to selectively change state and connect or disconnect from the main AC circuit 101. In an embodiment, any of the generators 104-110 may be turned on with its associated contactor with no additional connections to regulate the behavior of the other generators. Also shown in FIG. 3A, system controller 112 (FIG. 1) communicates with external AC generator 110 to start the AC generator 110, which energizes AC line or wire 302. Additionally, wire 301 from external AC generator 110 is used to energize coil in contactor 132 and provide AC power to line 304. Further line 304 provides AC power to line 306 via contactor 134, provides AC power to line 310 via contactor 150, provides AC power to line 308 via contactors 136, 138 and line 306, and provides power to line 312 via contactors 146, 148 and line 310. As such, AC power from external AC generator 110 is provided throughout the aircraft 102 (FIG. 1) on lines 308, 312 to power distribution modules 114-120 (FIG. 1). In FIG. 3B, the system controller 112 (FIG. 1) starts the APU generator 108 while maintaining external AC generator 110 in the ON condition through wire 303 to energize coil in contactor 132, which energizes AC line 314. Also, contactor control wire 409 from APU generator 108 energizes the coils in contactors 150, 134 to change state and disconnect the contactors from AC generator 110, thereby preventing the AC generator 110 from supplying AC power to lines 306, 310 and to power distribution modules 114-120. Further, sense wire 409 energizes contactor 134 causing AC power on line 314 to flow to line 306, while sense wire 409 energizes contactor 150 causing AC power on line 314 to flow to line 310. Further line 310 provides AC power to line 312 via contactors 146, 148 and to one half-of the aircraft 102, while line 306 provides AC power to line 308 via contactors 136, 138 and to the other half-of the aircraft 102. It is to be appreciated that AC power from APU generator 108 is provided throughout the aircraft 102 (FIG. 1) on lines 308, 312 to power distribution modules 114-120 (FIG. 1) by independently energizing contactors 132, and 150, thereby eliminating complex transfer timing issues for switching power from one or more generators.

Figure 3E:
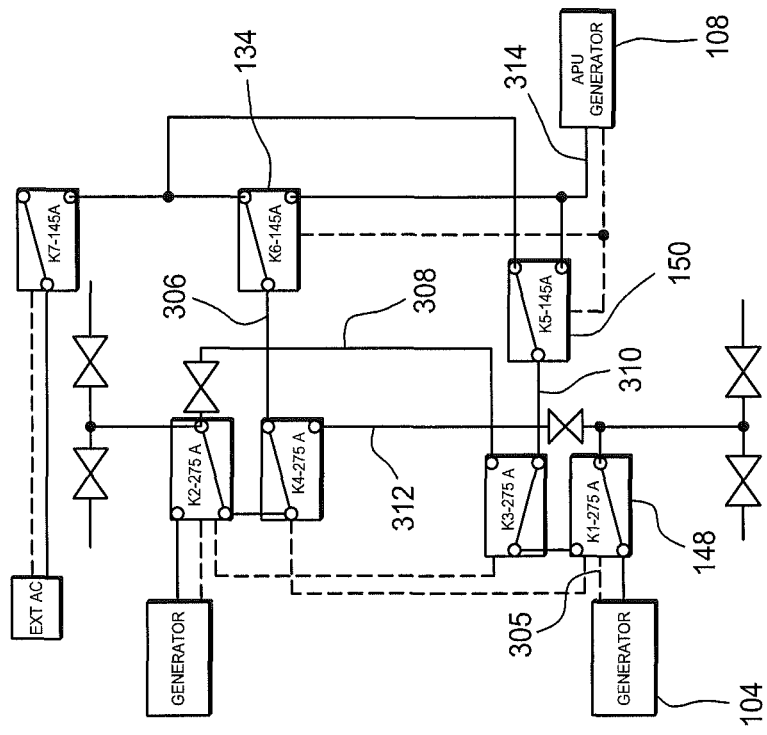
FIG. 3E illustrates another schematic block diagram of an algorithm used to distribute power in an aircraft according to an embodiment of the invention.
Figure 3D:
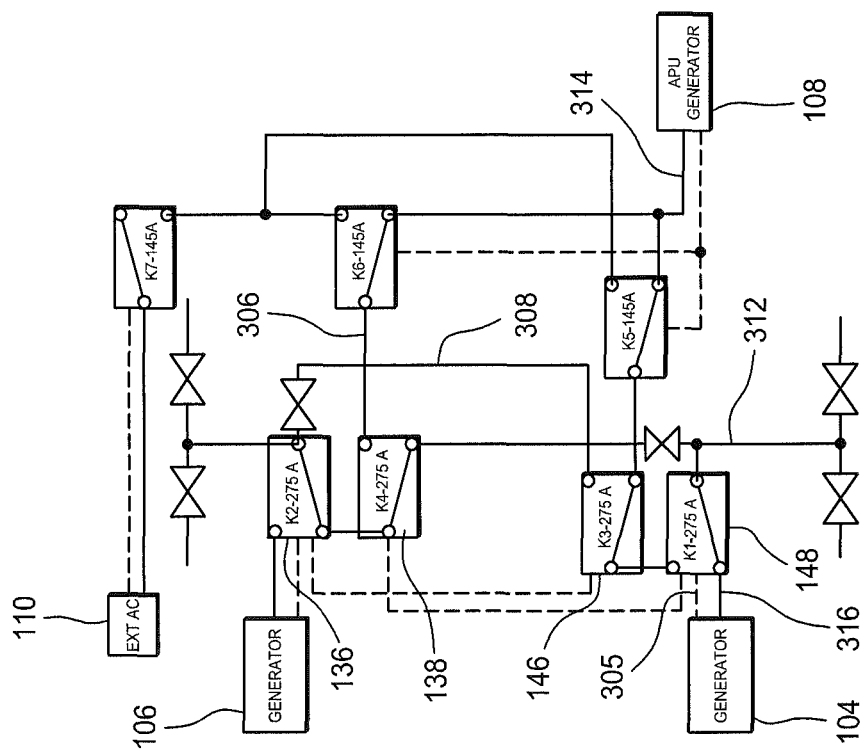
FIG. 3D illustrates another schematic block diagram of an algorithm used to distribute power in an aircraft according to an embodiment of the invention.

In FIG. 3C, the system controller 112 (FIG. 1) shuts off the External AC generator 110, maintains powering the APU generator 108, and starts the main AC generator 104, which energizes AC line 316. Additionally, contactor control wire 305 from main AC generator 104 energizes the coil in contactor 148 to change its state, causing AC power on line 316 to flow to line 312 and provide AC power to one half-of the aircraft 102 (FIG. 1). Generator 104 energizes contactor 148 without any other connections to the other generators on the aircraft 102 (FIG. 1). Also, the APU generator 108 maintains AC power to the other half of the aircraft through line 308. As shown in FIG. 3D, energized contactor 148 provides voltage on sense wire 307, causing the coil in contactor 138 to change its state and supply AC power from line 312 to line 308. Main AC generator 104 now supplies AC power to the entire aircraft 102 (FIG. 1) through lines 308, 312. Energizing contactor 138 causes AC power from APU generator 108 to be disconnected from line 308 as main AC generator 104 supplies AC power throughout the aircraft 102 (FIG. 1) on lines 308, 312 to power distribution modules 114-120 (FIG. 1). In another embodiment, the APU generator 108 may continue to be powered ON so as to maintain its standby state in case the main generator 104 fails. If the main generator 104 fails, contactors 138, 148 would be de-energized thereby causing contactor 148 to be coupled to contactor 146 and contactor 138 to be coupled to contactor 136. As such, APU generator 108 would supply AC power to lines 306 via line 314 and contactors 136, 138 in order to power lines 308 and 312. In FIG. 3E, the system controller 112 (FIG. 1) shuts down the APU generator 108, which de-energizes the coils in contactors 134, 150, causing the contactors 134, 150 to change state and decouple line 314 from line 306 and line 310, thereby disconnecting APU generator 108 from power distribution modules 114-120 (FIG. 1).

Figure 3G:
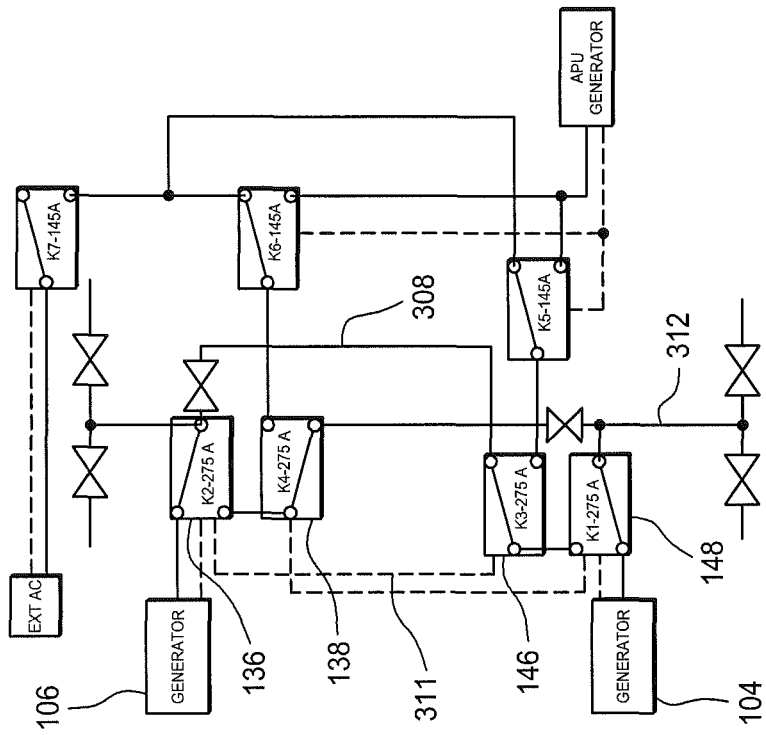
FIG. 3G illustrates another schematic block diagram of an algorithm used to distribute power in an aircraft according to an embodiment of the invention.
Figure 3F:
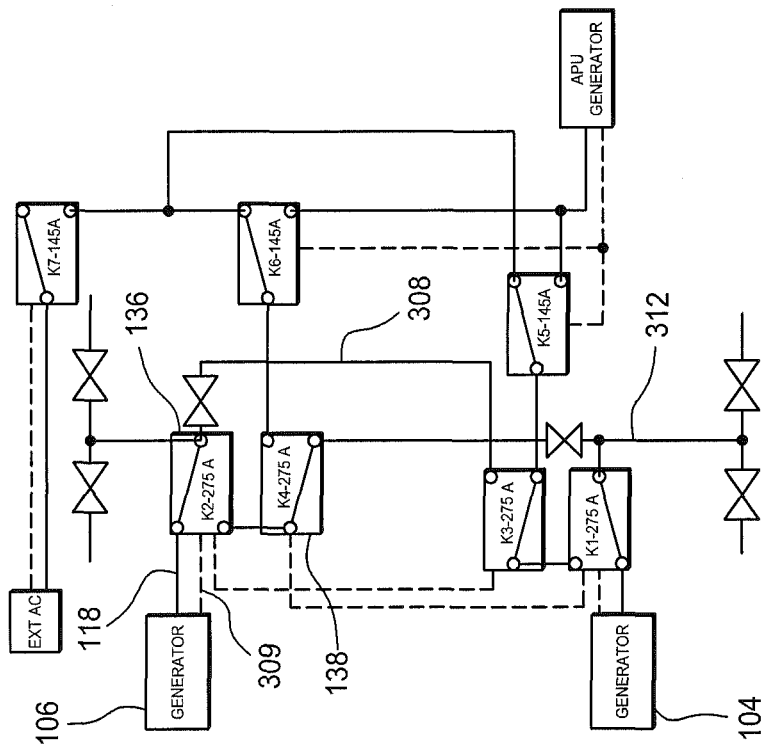
FIG. 3F illustrates another schematic block diagram of an algorithm used to distribute power in an aircraft according to an embodiment of the invention.

In FIG. 3F, the main AC generator 106 becomes active while main AC generator 104, is supplying AC power throughout aircraft 102 (FIG. 1). AC main generator 106 energizes line 318 and delivers AC power to contactor 136. Additionally, contactor control wire 309 from main AC generator 106 energizes the coil in contactor 136, changing its state, and causing AC power on line 318 to be fed to line 308, thereby providing power to one half-of the aircraft 102 (FIG. 1). Also, the contactor control wire 309 from main AC generator 106 causes the energized contactor 136 to be independently decoupled from contactor 138 and line 312 without external communication signals from system controller 112, thereby providing for independent interrupt and control for supplying AC power to the aircraft 102 (FIG. 1). As shown in FIG. 3G, energized contactor 136 provides a voltage on contactor control wire 311, causing the coil in contactor 136 to change its state and supply AC power from line 312 to contactor 148. Main AC generator 104 now supplies AC power to one half of aircraft 102 (FIG. 1) through line 312 while main AC generator 106 supplies AC power to the other half of aircraft 102 (FIG. 1). It is to be appreciated that power distribution system 100 provides a redundant AC distribution methodology by energizing contactor 146 in order to supply AC power from the AC generator 106 throughout aircraft 102 (FIG. 1) should AC generator 104 fail as well as energizing contactor 138 in order to supply AC power from the AC generator 104 throughout aircraft 102 (FIG. 1) should AC generator 106 fail.

Figure 4:
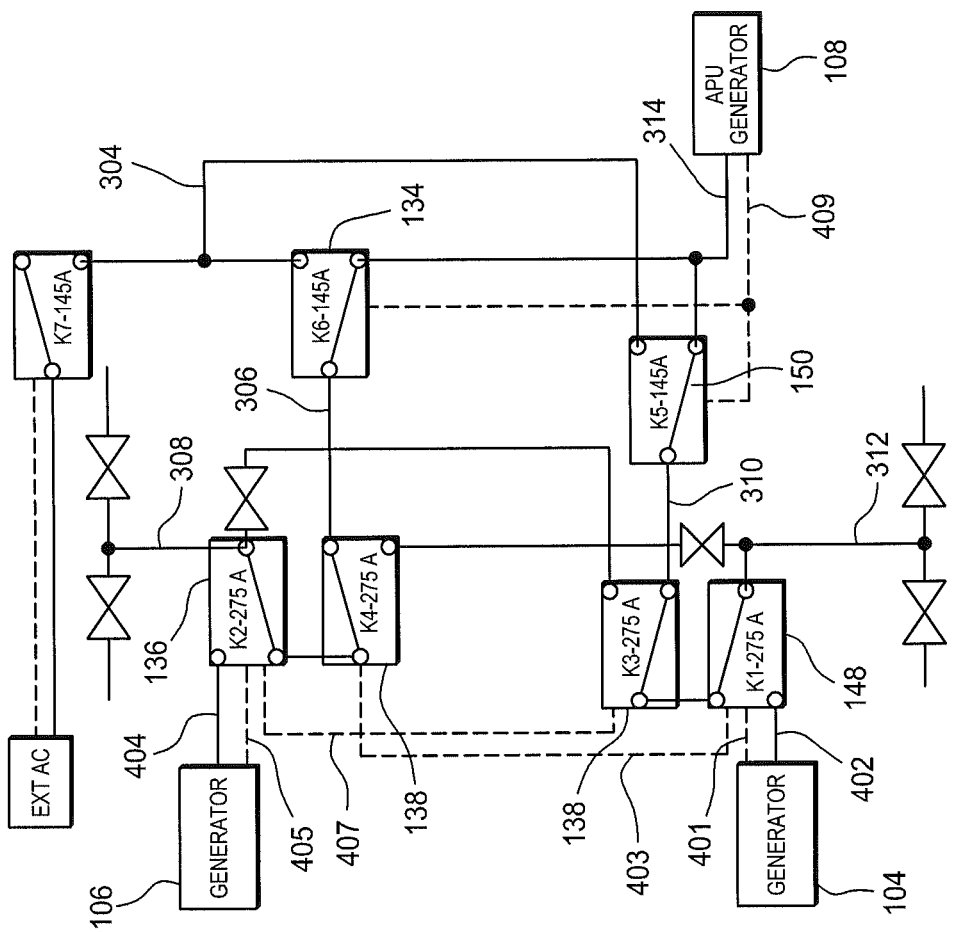
FIG. 4 illustrates a schematic block diagram of an algorithm used to distribute power in an aircraft after the failure of both main generators according to an embodiment of the invention.

FIG. 4 illustrates an algorithm implemented within power distribution system 100 for providing AC power to the aircraft 102 (FIG. 1) after both main AC generators 104, 106 have failed according to an embodiment of the invention. Particularly, with the failure of main AC generator 104, contactor control wire 401 would be de-energized causing contactor 148 to be electrically decoupled from line 402. Additionally, contactor control wire 403 would be de-energized causing contactor 138 to be electrically decoupled from line 312. Also, with the failure of main AC generator 106, sensor line 405 would be de-energized causing contactor 136 to be electrically decoupled from line 404. Additionally, contactor control wire 407 would be de-energized thereby causing contactor 138 to be decoupled from contactor 148. The system controller 112 (FIG. 1) communicates with APU generator 108 to start the APU generator 108, which energizes AC line 314. Additionally, the contactor control wire 409 from APU generator 108 is used to energize the coils in contactors 134, 150 and feeds AC power from line 314 to lines 306 and 310. Further line 310 provides AC power to line 312 via contactors 138, 148 and line 306 provides AC power to line 308 via contactors 136, 138. As such, AC power from APU generator 108 is provided throughout the aircraft 102 (FIG. 1) on lines 308, 312 to power distribution modules 114-120 (FIG. 1).

The technical effects and benefits of exemplary embodiments include an electrical power distribution system having a plurality of AC power generators each of which directly controls its power contactor in order to provide AC power within the system. The system includes AC and DC solid state circuit breakers (SSCB) located remotely throughout the aircraft for providing AC and DC power utilizing such power. The system also includes a system controller for transmitting commands to the SSCBs and controlling power delivered to loads connected to the SSCBs.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A distributed electrical power system, comprising:
a first AC generator configured for supplying an AC electrical voltage;
a second AC generator configured for supplying the AC electrical voltage;
an AC power distribution network connected to the first AC generator and the second AC generator for receiving the AC electrical voltage, the AC power distribution network including one of a two and four-wire AC power distribution circuit;
at least one power distribution module remotely located for receiving the AC electrical voltage from the power distribution network;
a system controller connected to a data bus for controlling operation of the at least one power distribution module; and
at least one contactor electrically connected between the at least one power distribution module and each of the first AC generator and the second AC generator for selectively switching supply of the AC electrical voltage to the at least one power distribution module from one of the first AC generator and the second AC generator upon failure of either one of the first AC generator and the second AC generator.

2. The system of claim 1, wherein the first AC generator is configured for supplying the AC electrical voltage to a first percentage of the power distribution modules connected to the power distribution network.

3. The system of claim 2, wherein the second AC generator is configured for supplying the AC electrical voltage to a second percentage of the power distribution modules connected to the power distribution network.

4. The system of claim 1, wherein the at least one power distribution module is configured for distributing the AC electrical voltage to at least one load connected thereof.

5. The system of claim 4, wherein either the first AC generator or the second AC generator independently of the other generator connects to the AC power distribution network for controlling distribution of the AC electrical voltage to the at least one load connected thereof.

6. The system of claim 1, wherein the at least one power distribution module comprises an AC solid state circuit breaker (SSCB) for distributing the AC electrical voltage to at least one AC electrical load connected thereof.

7. The system of claim 6, wherein the AC SSCB is configured for distributing the AC electrical voltage to an AC-to-DC converter connected thereof, the AC-to-DC converter configured for converting the AC electrical voltage to a DC electrical voltage.

8. The system of claim 7, wherein the at least one power distribution module further comprises a DC SSCB for distributing the DC electrical voltage to at least one DC electrical load connected thereof.

9. The system of claim 6, wherein the AC SSCB includes an AC current limiting device that is configured to open in response to sensing of an overcurrent flowing in any of the AC electrical loads connected thereof.

10. The system of claim 8, wherein the DC SSCB includes a DC current limiting device that is configured to open in response to sensing of an overcurrent flowing in any of the DC electrical loads connected thereof.

11. The system of claim 1, further comprising an APU generator for supplying the AC electrical voltage to the power distribution network.

12. The system of claim 1, further comprising an external AC generator for supplying the AC electrical voltage to the power distribution network.

13. The system of claim 1, wherein the at least one contactor is connected to the power distribution network for transmitting the AC electrical voltage upon sensing an energizing voltage.

14. The system of claim 1, wherein the system controller is configured for transmitting communication signals to each of the generators and the at least one power distribution module via the data bus.

15. A method of distributing power in a distributed electrical power system, comprising:
   providing a plurality of loads connected to an AC power distribution network;
   supplying AC electrical voltage, via an external AC generator, to the plurality of loads connected to the AC power distribution network;
   supplying the AC electrical voltage, via an APU generator, to the AC power distribution network;
   automatically connecting a first percentage of the plurality of loads to the APU generator and a second percentage of the plurality of loads to the external AC generator; the automatically connecting in response to the supplying of the AC electrical voltage from the APU generator;
   disconnecting the external generator from the AC power distribution network; and
   automatically connecting the plurality of loads to the APU generator, the automatically connecting in response to the disconnecting of the external generator from the AC power distribution network.

16. The method of claim 15, further comprising:
   supplying AC electrical voltage, via a first AC generator, to the AC power distribution network; and
   automatically connecting a third percentage of the plurality of loads to the first generator and a fourth percentage of the plurality of loads to the APU generator, the automatically connecting in response to the supplying of the AC electrical voltage from the first AC generator.

17. The method of claim 15, further comprising supplying the AC electrical voltage to at least one power distribution module connected to the AC power distribution network.

18. The method of claim 17, wherein the at least one power distribution module comprises an AC SSCB for distributing the AC electrical voltage to at least one AC electrical load connected thereof.

19. The method of claim 18, wherein the AC SSCB is configured for distributing the AC electrical voltage to an AC-to-DC converter connected thereof, the AC-to-DC converter configured for converting the AC electrical voltage to a DC electrical voltage.

20. The method of claim 19, wherein the at least one power distribution module further comprises a DC SSCB for distributing the DC electrical voltage to at least one DC electrical load connected thereof.

* * * * *